Aug. 9, 1932.  L. H. BROWN  1,871,404
METHOD OF AND APPARATUS FOR INDICATING SPEED
Filed Feb. 16, 1929
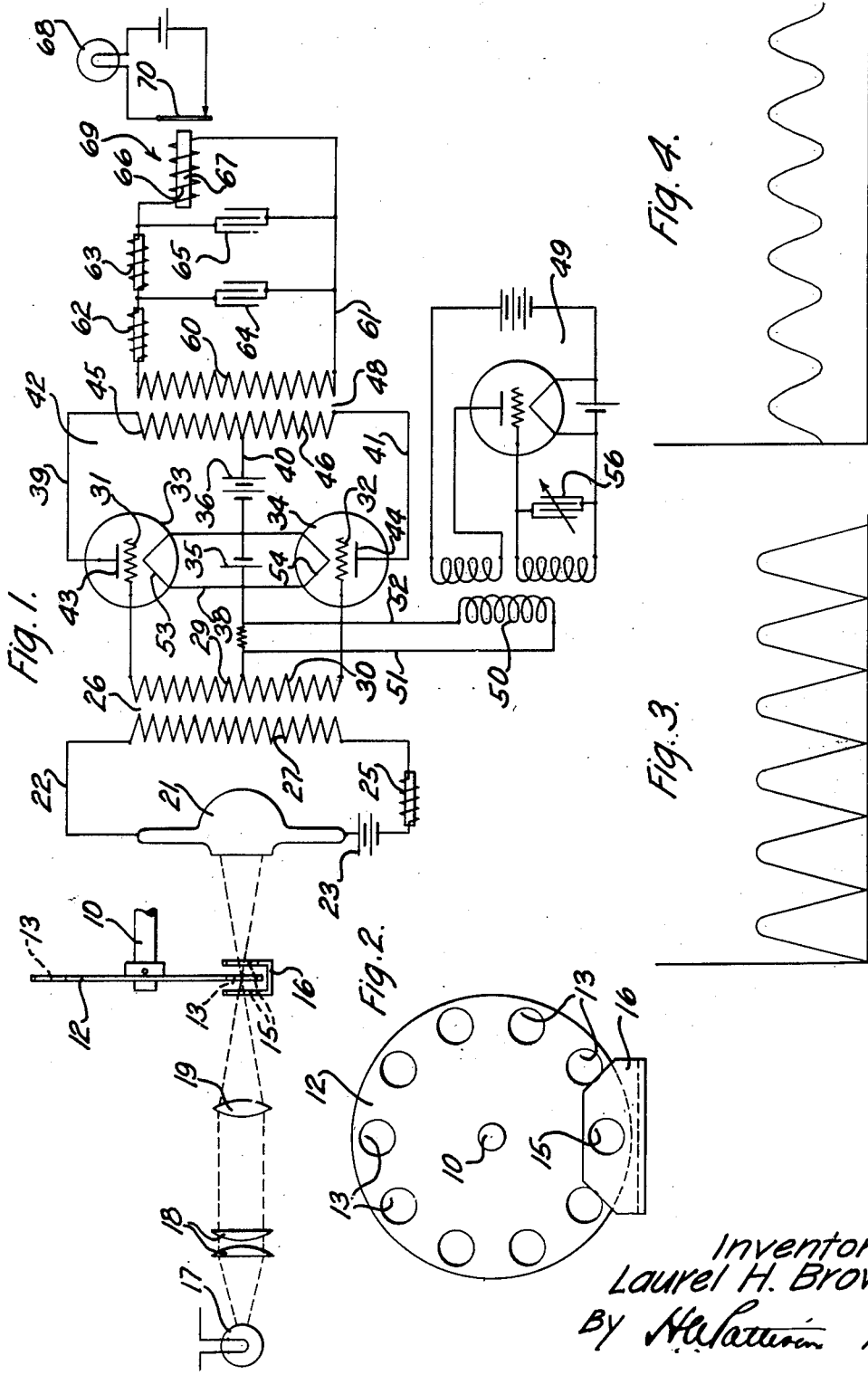
Inventor
Laurel H. Brown Patented Aug. 9, 1932

1,871,404

UNITED STATES PATENT OFFICE

LAUREL HERMAN BROWN, OF BERWYN, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR INDICATING SPEED

Application filed February 16, 1929. Serial No. 340,369.

This invention relates to a method of and apparatus for indicating speed, and more particularly to a method of and apparatus for indicating the speed of a rapidly moving member by means of an electrical current.

Objects of the invention are to provide a device capable of determining extremely high speeds and capable of indicating relatively slight deviations from a predetermined speed, and to provide an improved method for accurately determining and indicating speeds.

In one embodiment of the invention, the movement of a rapidly moving member is caused to produce a pulsating current in one circuit, and the pulsations of said current are then compared with the pulsations in a current of known frequency, means being employed to actuate an indicating device when the frequencies of the two circuits are substantially the same. To carry out this method, the moving part is interposed between a source of light and a photoelectric cell, which cell acts as a valve in the first circuit to cause periodic pulsations therein, these pulsations then being compared, by means of a modulation transformer, with a rapidly alternating current of known or determinable frequency produced by a vacuum tube oscillator. The combined result of the currents in the two circuits is to produce an alternating current in a third circuit, the frequency of the latter current being equal to the difference of the frequencies of the first two currents. Currents having higher frequencies are also produced in the third circuit, but such currents are eliminated by suitable filtering means, and the current having a frequency equal to the difference between the first two currents is caused to operate an electromagnetic device or other indicating device.

The invention will be more fully understood from the following description taken in connection with the appended drawing, in which Fig. 1 is a diagrammatic illustration of an apparatus embodying the invention;

Fig. 2 is a front elevation of the apertured disk;

Fig. 3 is a graphical representation of the variations in current produced by the photoelectric cell, and Fig. 4 is a similar representation of the same current as modified by a choke coil.

In the drawing, which illustrates one form of apparatus embodying the invention, the reference numeral 10 designates a shaft the speed of which is to be measured, although it is obvious that the invention is applicable to the measurement of the speed of any rotating element or any element which oscillates, gyrates or otherwise moves periodically through an orbital path. Fixed to the shaft is an opaque disk 12 having apertures 13 formed therein in such position as to be capable of registering with corresponding apertures 15 formed in a screen or shield 16 positioned in overlapping relation thereto, as illustrated in Figs. 1 and 2. The number of apertures 13 will vary according to the speed range to be measured, ten being shown in the illustrated embodiment, which is designed for the measurement of moderate speeds. Where very high speeds are to be measured, the number of apertures may be diminished to two or even one. The effective diameter of the apertures should in any case preferably be equal to the distance between adjacent apertures, in order to produce a rhythmic pulsation.

Aligned with apertures 15 is a source of radiant energy 17 which may be an electric lamp, although radiant energy in forms other than light may be used equally well. Lenses 18 and 19 may be interposed between lamp 17 and apertures 15 for the purpose of collimating and focusing the rays of light from the lamp upon the plane of the disk 12 whence, if an aperture 13 is in registry with apertures 15, the rays pass to a photoelectric cell 21 of any suitable construction for transforming fluctuations in the radiant energy coming to it from source 17 into corresponding fluctuations in electric current in its circuit 22. Circuit 22 includes a source of constant electromotive force such as a battery 23, and an impedance 25 for the purpose of damping or decreasing the amplitude of the oscillations produced by the photoelectric cell upon rotation of disk 12, the resulting current being changed from the form represented in Fig. 3 to the approximation of a sine curve shown in Fig. 4. The characteristics of the current in circuit 22 may also be varied by varying the number, size, and shape of apertures 13 and 15.

Reference numeral 26 designates a modulation transformer having its primary winding 27 included in the circuit 22. The transformer 26 has two secondary windings 29 and 30, connected to the grids 31 and 32 of the three-electrode vacuum tubes 33 and 34 of usual construction, the vacuum tubes being equipped with an A-battery 35 and a B-battery 36 and connected by means of leads 38, 39, 40 and 41 to form a balanced detector amplifier indicated generally at 42. The leads 39 and 41 connect the plates 43 and 44 of the vacuum tubes to primary windings 45 and 46 of a second transformer 48.

A vacuum tube oscillator 49 of usual construction has its winding 50 connected to amplifier 42 to supply thereto alternating current of known or determinable frequency, one terminal of the winding being connected, by a lead 51, to windings 29 and 30 while the other terminal is connected, by a lead 52, to the filaments 53 and 54 of the vacuum tubes of amplifier 42. A variable condenser 56 of usual construction is provided for tuning the oscillator, and may have its dial calibrated either in revolutions per minute, in oscillations per second, or in any other suitable divisions.

The secondary winding 60 of transformer 48 is included in a relay circuit 61, which circuit also includes choke coils 62 and 63 with cooperating condensers 64 and 65 to constitute a low-pass filter for the currents produced in circuit 61. Circuit 61 also includes the winding 66 of a relay 69 having a core 67 designed to operate an armature 70 for controlling a signal lamp 68 or other suitable indicating mechanism.

In operation, shaft 10 is rotated at an unknown speed, which, by means of the intermittent beams of light acting upon cell 21, causes a pulsating current of unknown frequency to flow through circuit 22. Oscillator 49 is put into operation to generate an alternating current of known frequency in winding 50, and the frequencies of the two currents are then electrically compared by the apparatus which, in the known manner, causes a current to flow through circuit 61 having a frequency equal to the difference between the frequencies of the photoelectric cell circuit and of the oscillator circuit. As long as the difference between the above mentioned frequencies is great, the current in circuit 61 will be of high frequency and will be eliminated by the filtering means 62, 63, 64 and 65; but when condenser 56 is varied to adjust the frequency of the oscillator current and thus make the two frequencies nearly equal, an alternating current of low frequency will flow through circuit 61 and winding 66 and cause core 67 to alternately actuate and release armature 70 and thus cause an intermittent flashing of light 68 to indicate that the frequency of circuit 22 is approximately equal to that of the oscillator current. When the two frequencies have been made as nearly equal as practicable, the dial which controls the tuning of condenser 56 may be read to give the revolutions per minute of shaft 10 directly or, if the dial is calibrated in cycles per second, the frequency of the oscillator circuit may be read in cycles per second and the speed calculated therefrom.

It will be understood that instead of the relay 69 and light 68 various other types of indicating devices may be used. Thus, a head-phone may be inserted within the circuit 61 to indicate by the pitch of the sound produced when the unknown frequency and the tuned frequency approach each other, or the movement of armature 70 may cause the actuation of an electric bell or other audible or visual indicating means. Other modifications of the embodiment herein shown and described will readily occur to those skilled in the art and the invention is therefore not intended to be limited except by the terms of the appended claims.

What is claimed is:

1. In a speed determining device, means under the control of the mechanism to be measured for producing a pulsating current having a regular sine-wave characteristic, an oscillatory circuit for producing a pulsating current, means for varying the frequency of the latter current at will, and means for electrically comparing the frequencies of the two currents.

2. In a speed measuring device, means for producing a pulsating current having a regular sine-wave characteristic the frequency of which bears a fixed ratio to the speed to be measured, adjustable means for producing a second pulsating current, means for electrically comprising the frequencies of the two currents to indicate when the frequencies are within predetermined limits, and means for indicating the frequency of the second current to indicate the speed when said frequencies are within said limits.

3. In a speed measuring device, means under the control of the mechanism to be measured for producing a pulsating current having a regular sine-wave characteristic, an oscillatory circuit for producing a second pulsating current, manually operative means for varying the frequency of said circuit, and a balanced detector amplifier for electrically comparing the two currents.

4. In a speed measuring device, means controlled by the mechanism to be measured for producing a pulsating current having a regular sine-wave characteristic, means for producing a second pulsating current, cooperating means for producing a third current having a frequency equal to the difference between the two first-mentioned currents, indicating means designed to be operated by the third current, and a low-pass filter interposed between said cooperating means and said indicating means to provide an upper cut-off limit for the third current frequency.

5. The method of measuring the speed of a moving member, which consists in causing the member to control the frequency of a pulsating current, independently generating a second pulsating current, varying the frequency of the second current until it is substantially equal to the frequency of the first current, and measuring the frequency of the second current to obtain the speed.

6. The method of measuring the speed of a moving member, which consists in generating a pulsating current having a frequency proportional to the speed of the moving member and have a regular sine-wave characteristic, independently generating a second pulsating current of determinable frequency, causing the two said currents to generate a third current having a frequency equal to the difference between the frequencies of the first and second currents, and determining when the frequency of the third current comes within predetermined limits.

In witness whereof, I hereunto subscribe my name this 31st day of January, A. D. 1929.

LAUREL HERMAN BROWN.